United States Patent [19]

Nonaka

[11] Patent Number: 4,598,394

[45] Date of Patent: Jul. 1, 1986

[54] OPTICAL REPRODUCING APPARATUS WITH FAST ACCESS MODE OPERATION

[76] Inventor: Chiaki Nonaka, c/o Sony Corporation, 7-35 Kitashinagawa 6-chome, Shinagawa-ku, Tokyo, Japan

[21] Appl. No.: 487,576

[22] Filed: Apr. 22, 1983

[30] Foreign Application Priority Data

Apr. 28, 1982 [JP] Japan .................................. 57-71674

[51] Int. Cl.$^4$ ........................ G11B 7/00; G11B 17/22; H04N 5/783
[52] U.S. Cl. ...................................... 369/44; 369/32; 358/342
[58] Field of Search ......................... 369/32, 43, 44; 358/342

[56] References Cited

U.S. PATENT DOCUMENTS

| | | | |
|---|---|---|---|
| 4,234,837 | 11/1980 | Winslow | 369/44 X |
| 4,375,091 | 2/1983 | Dakin et al. | 369/44 X |
| 4,414,584 | 11/1983 | Kurata | 358/907 X |
| 4,425,587 | 1/1984 | Kurata | 358/907 X |
| 4,488,184 | 12/1984 | Kurata | 358/907 X |
| 4,494,154 | 1/1985 | Akiyama | 358/342 |

FOREIGN PATENT DOCUMENTS

| | | | |
|---|---|---|---|
| 0017433 | 10/1980 | European Pat. Off. | 369/44 |
| 0073921 | 3/1983 | European Pat. Off. | 309/44 |

Primary Examiner—Aristotelis M. Psitos

[57] ABSTRACT

An optical reproducing apparatus for read-out of information recorded in parallel, substantially circular tracks on a record disc includes an optical pickup head having an object lens for focusing a light beam at the disc, a tracking servo mechanism for controlling the point of impingement of the light beam on the record disc in directions transverse to the tracks, a jump pulse generator, a drive motor for moving the optical pickup head along a radial direction of the disc, and a control circuit for driving the motor. In an access or search mode of the apparatus, the jump pulse generator provides jump pulses to the tracking servo mechanism by which the point of impingement of the light beam is made to jump across the tracks toward a desired or target track. In response to the jump pulses, the control circuit provides respective drive signals for the motor with the duration of each drive signal being greater than the duration of the respective jump pulse to compensate for the effect of the relatively large inertia of the optical pickup head.

9 Claims, 24 Drawing Figures

FIG.1

PRIOR ART

OPTICAL REPRODUCING APPARATUS WITH FAST ACCESS MODE OPERATION

BACKGROUND OF THE INVENTION

1. Field of the Invention

The present invention relates to an optical reproducing apparatus and more particularly to an optical reproducing apparatus suitable for use with an optical disc and which employs a laser beam for reproducing audio or video signals recorded in the form of pits or bumps suitably arranged along parallel, substantially circular tracks on a disc.

2. Description of the Prior Art

Optical disc players of the type described above typically include an optical pickup head having a focus servo mechanism and a tracking servo mechanism so as to properly trace or scan the parallel tracks which may be successive turns of a spiral. Generally, each track has a pit array which is not more than 1 m in width. The focus servo mechanism focuses the laser beam at the disc so as to form a beam spot thereon and the tracking servo mechanism shifts the laser beam spot in a radial direction of the disc. Additionally, the entire optical pickup head is moved in the radial direction through use of a motor-driven feed screw or a guide member.

In locating a particular or target track for reproducing the recorded information therein, hereinafter referred to as the access mode of operation of the player, the optical pickup head is moved rapidly to a desired position corresponding to a specific track address on the disc. In this access mode, a DC stepping voltage is applied to the motor for driving the feed screw or guide member of the optical pickup head for radially shifting the entire optical pickup head by one or more large steps. During such radial shifting of the head, data recorded on tracks within a control range (generally, ±0.2 to 0.4 mm) of the tracking servo mechanism is intermittently read out. As the optical pickup head approaches the desired or target track, the head is shifting by relatively smaller steps (e.g., track by track). As a result, the optical pickup head can accurately access the target track at a relatively high speed.

In the above described access mode, operation of the tracking servo mechanism follows the motor driven radial shifting of the optical pickup head. The tracking servo mechanism is reset every time the optical pickup head reaches the farthest point in the tracking range with the result that the laser beam spot is shifted or moved in a step-by-step manner. However, when the optical pickup head is radially shifted by a large step, it may "overrun" that is, move beyond the desired or target track, due to any one or more of the following reasons: play between the gears of the motor driven feed mechanism for shifting the optical pickup head; fluctuation in servo characteristics such as secondary resonance of the tracking servo mechanism; and delays in the operation of an arithmetic operational device for controlling the overall operation of the apparatus. Therefore, the access time required for reaching the target track may be prolonged during the subsequent smaller-step shifting from the overrun position.

Another proposed access mode employs jump pulses which are supplied to the tracking servo mechanism and by which the latter causes the laser spot beam to jump a substantial number of tracks, generally, 100 to 200 tracks, for each jump. Simultaneously, a jump pulse voltage is applied to the driving or feed motor of the optical pickup head, thereby to shift the entire optical pickup head after the laser spot beam has completed each jump.

In the last described access mode, the operation of the tracking servo mechanism does not follow the movement of the optical pickup head so that tracking can be performed without "overrunning" the target track. Therefore, the optical pickup head can be made to travel a relatively short access distance between the present track and the target track at a relatively high speed. However, since the jump range of the laser beam spot for each step is limited, a relatively long period of time is required for the laser beam spot to reach the target track when there is a large access distance, that is, a large distance between the present track and the target track. To enlarge the jump range of each step, a high loop gain of the tracking servo mechanism is required to compensate for the damping force of the tracking servo mechanism which occurs immediately after the beam jump. However, as the loop gain is increased, there is a corresponding increase in the servo phase angle, that is, the angle between the phase of the voltage from the photodetector of the tracking servo corresponding to a detected tracking error and the phase of the corresponding correcting voltage applied by the tracking servo, for example, to the coil of the galvano-mirror for correcting the tracking error. Further, if the servo phase angle is increased beyond a predetermined value, known as the servo phase allowance, the servo loop oscillates and stable operation of the tracking servo mechanism cannot be achieved.

OBJECTS AND SUMMARY OF THE INVENTION

Accordingly, it is an object of the present invention to provide an optical reproducing apparatus which avoids the above described disadvantages of the prior art.

More specifically, it is an object of the present invention to provide an optical reproducing apparatus which, in its access mode, increases the jumping range of the light beam of an optical pickup head without causing overrunning of the target track, thereby reducing the access time required to reach the target track as compared to the prior art.

In accordance with an aspect of this invention, an optical reproducing apparatus for read-out of information recorded in substantially parallel tracks on a record medium, preferably in the form of a disc, comprises optical pickup means for reproducing the information including light source means emitting a beam of light and tracking servo means for controlling the point of the impingement of the light beam on the record medium in directions transverse to the tracks; jump pulse generator means operative for supplying jump pulses to the tracking servo means by which the latter effects step-by-step movement of the light beam in a direction across said tracks, each such jump pulse including at least an accelerating portion; drive means operative for driving the optical pickup means in a direction transverse to said tracks; and control means for supplying drive signals to operate the drive means in synchronism with the jump pulses, with each drive signal having a duration greater than at least the duration of the accelerating portion of the jump pulse which is in synchronism therewith.

DETAILED DESCRIPTION OF PREFERRED EMBODIMENTS

In order to better understand certain preferred embodiments of the present invention, a conventional tracking servo and pickup head drive system which can employ the present invention will be described with reference to FIGS. 1 and 2.

Figure 1:
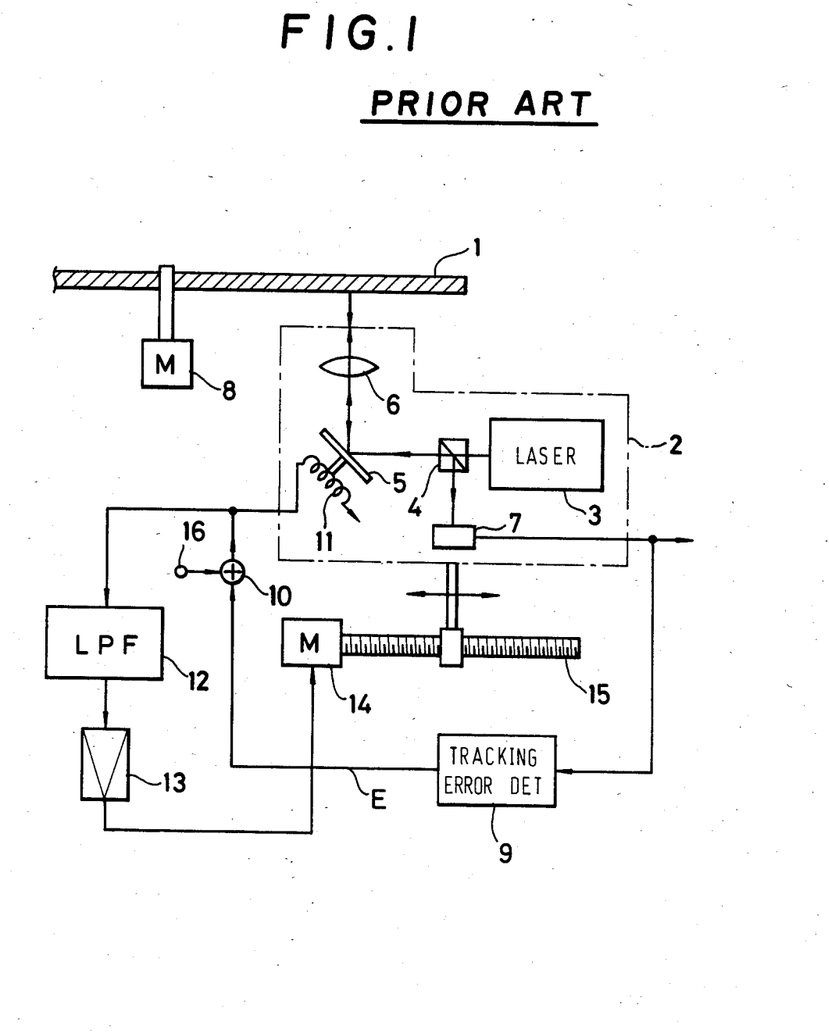
FIG. 1 is a schematic block diagram of major components of a conventional optical disc player to which the present invention can be applied.

In FIG. 1, a record medium in the form of a disc 1 has data recorded in the form of an array of pits arranged along parallel, substantially circular tracks which may be successive turns of a spiral on disc 1. In the reproducing mode of operation, a beam of light is emitted from a laser 3 included in an optical pickup head 2 and is directed by a beam splitter 4, a tracking galvano mirror 5 and an objective lens 5 so as to be focused at a surface of disc 1 rotated by a motor 8. The laser beam, upon impinging on disc 1 at a track thereof, is modulated by the pits thereof, and the modulated beam is reflected by the disc so as to be directed through lens 6 and galvano mirror 5 to beam splitter 4 which directs the modulated light beam to a photodiode array 7 which converts the modulated light into an electric reproduced signal.

The laser beam, prior to being directed against disc 1, is desirably split by a diffraction grating (not shown) into a central split beam and two side split beams. he central split beam is used to read data from the track being scanned while the two side split beams are used to detect any tracking error of the central split beam in respect to the track being scanned. More particularly, the two side split beams are slightly spaced apart so as to be focused at sides of the track which is being read by the central split beam. When a tracking error occurs, the intensity of one of the two side split beams, as reflected by disc 1, becomes greater than the intensity of the other reflected side split beam, from which the extent and direction of the tracking error can be detected by corresponding portions of photodiode array 7.

A corresponding output signal from photodiode array 7 is supplied to a tracking error detector 9 which provides an output signal, hereinafter referred to as tracking error correction signal E, through an adder 10 to a coil or transducer 11 by which mirror 5 is angularly deflected. Accordingly, galvano mirror 5 is angularly controlled or deflected to eliminate the detected tracking error. As is also known, objective lens 6 may be automatically displaced in the direction of its optical axis by a suitable focus servo mechanism so that the laser light beam continues to be focused at the surface of rotated disc 1 even though the latter may be somewhat warped. As an alternative to the angularly displaceable mirror 5 for effecting tracking servo control, a known two-axis servo device can be used to perform tracking and focusing control by effecting movements of objective lens 6 in the direction of its optical axis and in the direction transverse or across the tracks.

The error correction signal E supplied from adder 10 to coil 11 is also supplied to a low-pass filter 12 which extracts a low-frequency component of error correction signal E ranging from DC component to a frequency of several Hertz. The low-frequency (or average) component obtained from the output of filter 12, which represents an error in the position of optical pickup head 2 relative to the track of disc 1 which is being read or scanned by the central split beam, is supplied through an amplifier 13 to a feed motor 14 by which a feed screw 15 is driven for moving optical pickup head 2 in a radial direction of disc 1.

When the beam spot is to be shifted a large radial distance on disc 1, for example, in an access mode of the optical disc player when searching for a desired or target track, a jump pulse is suitably supplied from a terminal 16 to adder 10 and acts in coil 11 to cause a correspondingly large angular displacement of mirror 5 for radially shifting the beam spot. The low frequency component of such jump pulse is also supplied through filter 12 as a drive signal to feed motor 14. Accordingly, optical pickup head 2 is shifted in a radial direction of disc 1 to follow the large jump or radial shift of the beam spot.

Figure 2:
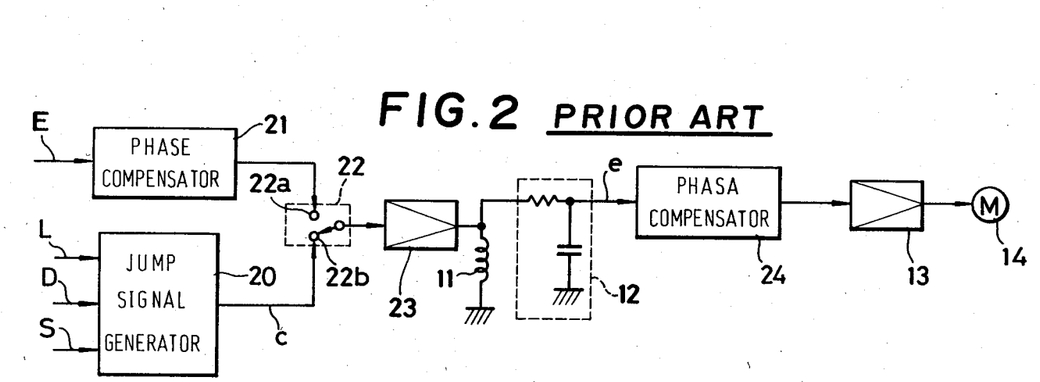
FIG. 2 is a block diagram of a conventional tracking servo and pickup head drive system for an optical disc player of the type shown in FIG. 1.

In FIG. 2, tracking error correction signal E, for example, from tracking error detector 9 on FIG. 1, is shown to be supplied through a phase compensator 21, which ensures a servo phase allowance, and through a fixed contact 22a of a changeover switch 22 to an amplifier 23. An amplified output from amplifier 23 is supplied to coil 11 of the galvano mirror 5 of FIG. 1. The output signal from amplifier 23 is also supplied to low-pass filter 12, and thence through phase compensator 24 and amplifier 13 to feed motor 14.

When an access mode of operation is selected, a system control unit, such as, a CPU or microprocessor (not shown), supplies a large-step jump command signal L or a small-step jump command signal S and a jump direction command signal D to a jump signal generator 20 which, in response thereto, produces a jump pulse c. The direction of command signal D and whether the jump command signal is for a large-step, as at L, or for a small-step, as at S, depend upon the distance between the track being pesently scanned and the desired or target track, as is well known. The jump pulse c obtained at the output of generator 20 is applied to a fixed contact 22b of changeover switch 22 which, when the access mode of the apparatus is selected, has its movable contact positioned as shown on FIG. 2 so that each jump pulse c is supplied through amplifier 23 to coil 11 for angularly displacing mirror 5, and is also applied to low-pass filter 12 to provide drive signals for motor 14 by which optical pickup head 2 is moved in the radial direction of disc 1.

Figure 4A:
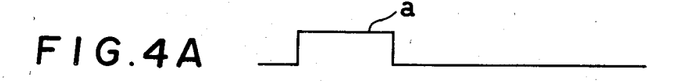
FIGS. 4A–4E are timing charts to which reference will be made in explaining the operation of the control circuit of FIG. 3.
Figures 4B, 4C:
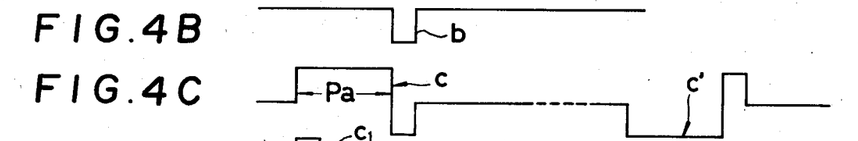

As shown on FIG. 4C, each jump pulse c has an accelerating portion of one polarity and of a duration $P_a$ and a decelerating portion of the opposite polarity and of a duration $P_b$. Thus, in the access mode of the optical reproducing apparatus, the application of the accelerating portion of a jump pulse c to coil 11 causes angular acceleration of mirror 5 in the direction for causing the laser beam spot to move transversely across the tracks on disc 1 in the direction from the track being scanned at the initiation of the access mode toward the target or desired track. At the termination of the duration $P_a$ of the accelerating portion of jump pulse c, the application of the decelerating pulse of opposite polarity to coil 11 for the duration $P_b$ causes deceleration of the angular displacement of mirror 5 and of the movement of the laser beam spot. Of course, the jump signal shown at c on FIG. 4C and having an accelerating portion of positive polarity assumes that the direction command signal D applied to generator 20 indicates the necessity of moving the laser beam spot in one radial direction across the tracks on disc 1 from the track being scanned at the initiation of the access mode toward the target track. However, if the direction command signal indicates the need to move the laser beam spot in the opposite radial direction across the tracks from the track being scanned at the initiation of the access mode toward the target track, then the jump pulse will have an initial accelerating portion of negative polarity and a following decelerating portion of positive polarity, as shown at c' on FIG. 4C. If the jump of the laser beam spot across the tracks resulting from the application to coil 11 of the jump pulse c or c' still leaves the laser beam spot a substantial distance from the target track, then jump signal generator 20 suitably provides another jump pulse c or c' so that the movement of the laser beam spot toward the target track is effected in a step-by-step manner. When the laser beam spot has been moved to a position a relatively small distance from the target track, generator 20 receives a small-step jump command signal S and, in response thereto, provides a jump signal $c_1$ or $c'_1$ having accelerating and decelerating portions of correspondingly reduced durations, as shown on FIG. 4D, so as to bring the laser beam spot close to the target track. It will be appreciated that, during the application of the jump pulse or pulses to coil 11 in the access mode of the apparatus, the closed tracking servo loop is interrupted at changeover switch 22. However, when the laser beam spot has been brought close to the target track, the system control unit conventionally changes-over switch 22 to engage its movable contact with fixed contact 22a and thereby reestablish the closed tracking servo loop in which the tracking error correction signal E is applied to coil 11 for causing the laser beam spot to accurately scan the target track.

Of course, the extent to which the laser beam spot can be moved radially across the tracks in the access mode of the apparatus by means of angular displacement of galvano mirror 5 is limited. Therefore, in the access mode of the apparatus, the jump pulse c or c' from generator 20 is integrated by low-pass filter 12 so as to obtain a corresponding drive signal e supplied through phase compensator 24 and amplifier 13 for driving motor 14 by which the pickup head 2 is moved radially as a unit. It will be appreciated that, if the entire jump pulse c, that is, both the accelerating and decelerating portions thereof are applied to low-pass filter 12 for forming the drive signal e, the integration of the decelerating portion of the jump pulse will cause a rapid fall in the drive signal e immediately after the duration $P_a$ of the accelerating portion, for example, as indicated in broken lines at e' at FIG. 4E. In other words, each drive signal for motor 14 would have a duration corresponding to the duration $P_a$ of the accelerating portion of the respective jump pulse c. However, the inertia of the mechanism, for example, motor 14 and screw 15, provided for effecting feeding movements of the optical pickup head 2, as a unit, is greater than the inertia of galvano mirror 5 by which tracking movements are effected. Thus, if each drive signal is attenuated or cut short, as at e' on FIG. 4E, the movement of the pickup head 2 as a unit will lag relative to the shifting of the laser beam spot by angular displacement of mirror 5 in response to application of each jump pulse to coil 11, and such movement of pickup head 2 will be effected at a relatively low speed. The result of the foregoing is that the radial movement of pickup head 2, as a unit, in response to each jump pulse c or c' will be smaller than the movement of the laser beam spot resulting from angular displacement of mirror 5 in response to the application of the corresponding jump pulse to coil 11. Such disparity between the step-by-step movements of pickup head 2 by motor 14 and the step-by-step movements of the laser beam spot by angular displacements of mirror 5 will be cumulative, thereby limiting or restricting the extent of the step-by-step movement of the laser beam spot that can be effected in the high-speed access mode of the apparatus according to the prior art.

Figure 3:
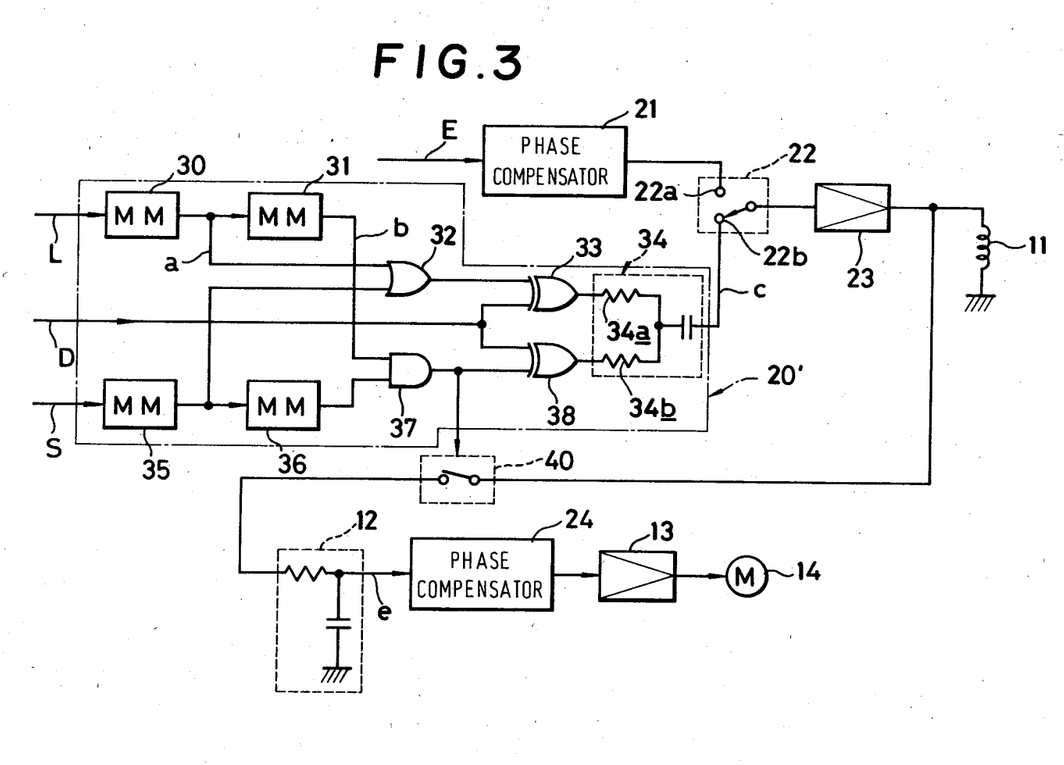
FIG. 3 is a block diagram of a circuit for controlling a tracking servo and pickup head drive system in an optical disc player in accordance with the present invention.

Referring now to FIG. 3, it will be seen that, in a circuit for controlling a tracking servo and pickup head drive system in an optical disc player in accordance with the present invention, and which is otherwise similar to the system described above with reference to FIG. 2, a jump signal generator 20' includes a monostable multivibrator 30 which is triggered by the large-step jump command signal L to produce a pulse a (FIG. 4A) of positive polarity having the duration $P_a$. Such output pulse a from monostable multivibrator 30 is supplied to a monostable multivibrator 31 and also to one input of an OR circuit 32. Monostable multivibrator 31 is of a type normally providing a relatively high level output, and is triggered or enabled by the trailing edge of pulse a from monostable multivibrator 30 to provide an output pulse b (FIG. 4B) of relatively low level or negative polarity. The output of OR circuit or gate 32 is connected to one input of an exclusive OR gate 33 which has its output connected to an input of a mixing circiut 34. Jump pulse generator 20' is further shown to include a monostable multivibrator 35 which is triggered by a small-step jump command signal S to provide a high level pulse of short duration, for example, corresponding to the duration of the accelerating or positive polarity portion of the jump pulse $c_1$ shown on FIG. 4D. The output of monostable multivibrator 35 is supplied to another input of OR circuit 32 and also to a monostable multivibrator 36 which, similarly to the monostable multivibrator 31, provides an output that is normally at a high level, but which is reduced to a low level or a negative polarity in response to the trailing edge of the high level pulse from monostable multivibrator 35. The monostable multivibrator 36, after being thus enabled or triggered, maintains its output at the low level for a relatively short duration, for example, corresponding to that of the negative polarity or decelerating portion of the jump pulse $c_1$ on FIG. 4D. The outputs of monostable multivibrators 31 and 36 are applied to respective inputs of an AND gate 37 which has it output connected to an input of an exclusive OR gate 38 and also to a control terminal of a switch circuit 40 which is closed, as shown on FIG. 3, whenever the output of AND gate 37 is at a high level, and which is opened whenever the outut of AND gate 37 is at a low level. The output of exclusive OR gate 38 is connected to another input of mixer circuit 34 which has its output connected to contact 22b of switch 22. Finally, in the jump pulse generator 20' of FIG. 3, the direction command signal D is connected to respective second inputs of exclusive OR gates 33 and 38, and the inputs of mixing circuit 34 which receive the outputs of exclusive OR gates 33 and 38 are connected to respective scaling resistors 34a and 34b which are relatively dimensioned so that the high level or "1" output of exclusive OR gate 33 will correspond to the high level of the accelerating portion of jump pulse c or $c_1$, the low level or "0" output of exclusive OR gate 33 and the normally high level or "1" output of exclusive OR gate 38 will correspond to the neutral voltage level at the output of mixing circuit 34, that is, when there is neither an accelerating or decelerating portion of a jump pulse at such output, and the low level or "0" level at the output of exclusive OR gate 38 corresponds to the low level or negative polarity of the decelerating portion of jump pulse c or c'.

Figure 4D:
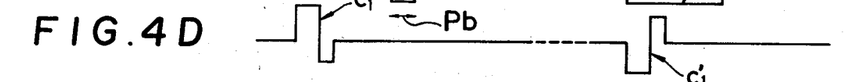
Figure 4E:
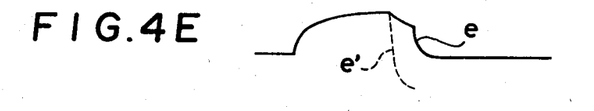

In the embodiment of the invention illustrated on FIG. 3, the direction command signal D is at a low or "0" level when it is necessary that the jump pulse have an accelerating portion of positive polarity, as at c or $c_1$ on FIGS. 4C and 4D, for causing the laser beam spot to move across the tracks in the direction from the initial track beam scan toward the target track. However, when such movement of the laser beam spot toward the target track requires that the jump pulse have an accelerating portion of negative polarity, as at c' or $c'_1$ on FIGS. 4C and 4D, then the direction command signal D is at a high or "1" level. In all cases, the output of AND gate 37 is at a high or "1" level to close switch 40 during the accelerating portion of each jump pulse, and the output of AND gate 37 is at a low or "0" level to open switch circuit 40 during the decelerating portion of each jump pulse, whether such jump pulse has accelerating and decelerating portions of positive and negative polarities, as in the case of the jump pulses c and $c_1$, or accelerating and decelerating portions of negative and positive polarities, respectively, as in the case of the jump pulses c' and $c'_1$.

As earlier explained with reference to FIG. 2, in the access mode of operation of the apparatus according to the present invention, each of the jump pulses c, c', $c_1$ or $c'_1$ is supplied through changeover switch 22 to coil 11 for causing angular displacement of the respective galvano mirror in the direction effecting rapid movement of the laser beam spot across the tracks in the direction toward the target track. The accelerating portion of each jump pulse is also applied through closed switch 40 to low pass filter 12 which thereby provides the drive signal e for motor 14. Since switch 40 is open during the decelerating portion of each jump pulse, for example, in the duration $P_b$, the drive signal e supplied to feed motor 14 is not abruptly attenuated as a resultof the decelerating portion of the jump pulse. That is, the drive signal e resulting from integration of the accelerating portion of a jump pulse decays only slowly upon opening of switch circuit 40 with the result that the period of radial movement of the optical pickup head 2 is extended in response to each drive signal e, thereby increasing the radial distance that the pickup head is displaced in the direction toward the target track in response to each jump signal.

Figure 5:
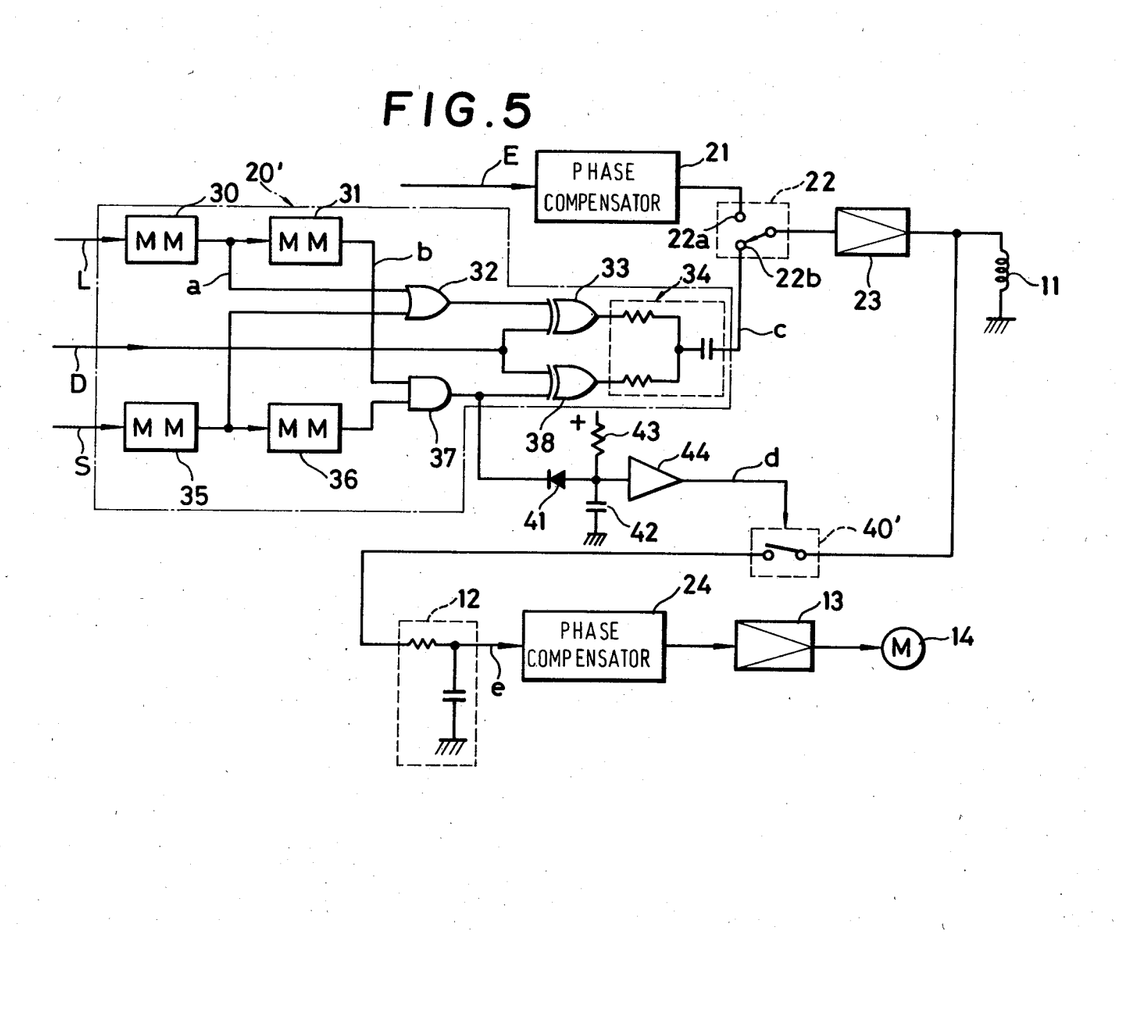
FIGS. 5, 7 and 9 are block diagrams corresponding to that of FIG. 3, but illustrating other respective embodiments of the present invention.
Figures 6A, 6B:
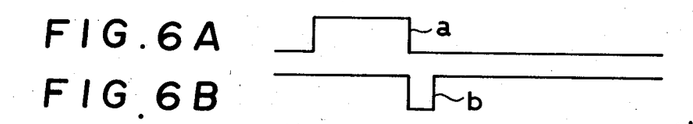
FIGS. 6A–6E, FIGS. 8A–8D and FIGS. 10A–10D are timing charts to which reference will be made in explaining the operations of the embodiments of FIGS. 5, 7 and 9, respectively.
Figure 6C:
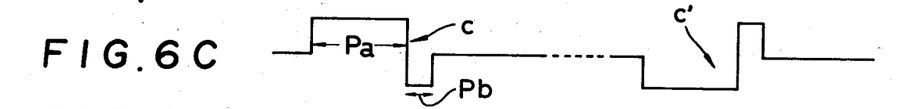
Figure 6D:
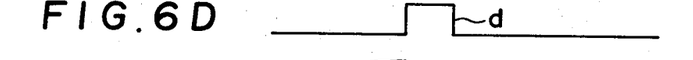
Figure 6E:
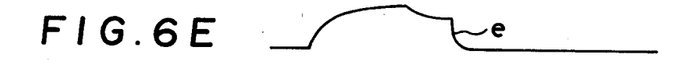

Referring now to FIG. 5, it will be seen that, in accordance with another embodiment of this invention which is generally similar to that described above with reference to FIG. 3, and which has its corresponding parts identified by the same reference numerals, the output of AND gate 37 of jump pulse generator 20' is supplied to a delay time constant circuit which comprises a diode 41, a capacitor 42 and a resistor 43 connected to each other and to a voltage source +, as shown, and the delayed output from such time constant circuit is shaped by a pulse shaper/amplifier 44 which produces a pulse d (FIG. 6D) having a duration greater than the duration $P_b$ of the corresponding jump pulse c (FIG. 6C) issuing from generator 20'. In this embodiment, a switch circuit 40' through which the jump pulse c is applied to low pass filter 12 is of a type that is normally closed, and is opened in response to the pulse d from amplifier 44. Thus, after the accelerating portion of each jump pulse c is applied through closed switch circuit 40' to low pass filter 12 which thereby produces a corresponding drive signal e (FIG. 6E) for motor 14, switch 40' is opened at the onset of the respective decelerating portion of the respective jump pulse and remains open for the extended duration of the pulse d so as to correspondingly extend the slow decay of the drive signal e. Accordingly, for each jump pulse c applied to coil 11 for causing the respective galvano mirror to cause the laser beam spot to rapidly cross the tracks in the direction toward the target track, there will be a movement of the optical pickup head 2 by motor 14 in the corresponding direction, which feed movement of the pickup head will be relatively extended beyond the duration $P_b$ of the decelerating pulse b (FIG. 6B) from monostable multivibrator 31, whereby to increase the extent to which the beam can be made to jump in the access mode of the apparatus, even beyond that achievable with the embodiment of the invention described with reference to FIG. 3.

Figure 7:
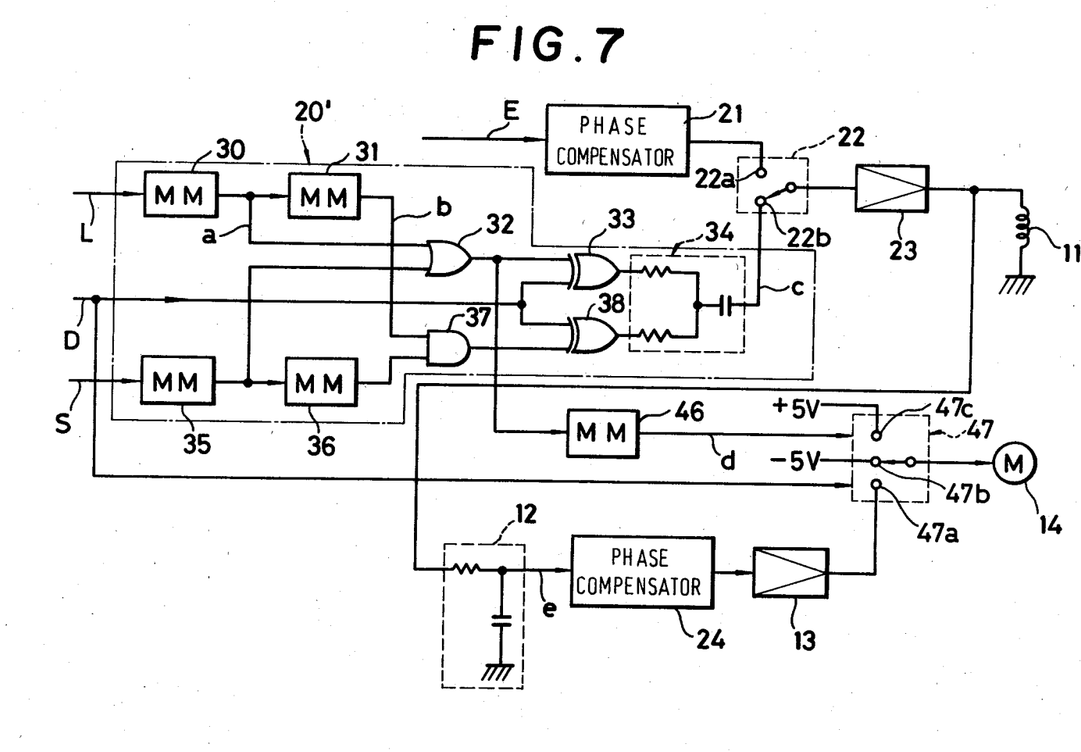
Figure 8A:
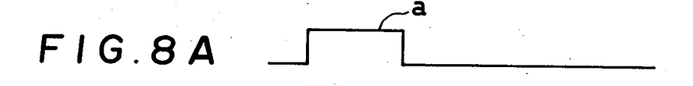
Figure 8B:
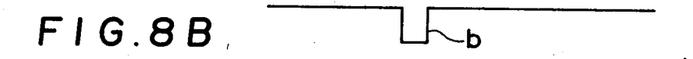
Figure 8C:
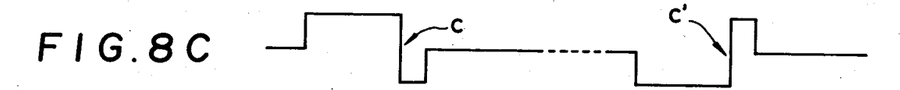
Figure 8D:
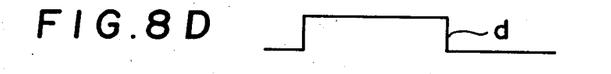

Referring now to FIG. 7, it will be seen that, in another embodiment of the present invention in which parts corresponding to those described above with reference to FIG. 3 or FIG. 5 are identified by the same reference numerals, the control circuit for supplying the drive signals to motor 14 in synchronism with the jump pulses from generator 20' includes a monostable multivibrator 46 connected to the output of OR circuit 32 so as to be triggered or enabled by the leading edge of the accelerating portion (FIG. 8A) of the jump pulse (FIG. 8C). When thus triggered or enabled, monostable multivibrator 46 provides a pulse d (FIG. 8D) having a width or duration greater than the sum of the pulse widths of the pulses a and b (FIGS. 8A and 8B) from monostable multivibrators 30 and 31, respectively. The output of monostable multivibrator 46 is applied, as a switch control signal, to a changeover switch circuit 47 having first, second and third fixed contacts 47a, 47b and 47c selectively engageable by a movable contact connected with motor 14. Switch circuit 47 is also controllable by jump direction command signal D so that, for the duration of each control pulse d from monostable multivibrator 46, the movable contact of switch circuit 47 engages either second contact 47b or third contact 47c in dependence on the level of jump direction command signal D and, in the absence of control pulse d, the movable contact of switch circuit 47 engages first fixed contact 47a. Further, as shown, low pass filter 12, phase compensator 24 and amplifier 13 are connected in sequence between the output of amplifier 23 and first fixed contact 47a, while the second and third fixed contacts 47b and 47c of switch circuit 47 are connected to respective sources of voltage −5 V and +5 V.

In the playback or reproducing mode of operation of the embodiment of the invention shown on FIG. 7, the movable contact of switch 22 engages fixed contact 22a and the movable contact of switch circuit 47 engages fixed contact 47a so that the tracking error correction signal E is supplied through switch 22 and amplifier 23 to coil 11 for maintaining accurate scanning of a track on the disc by the laser beam spot, and the tracking error correction signal is further applied to low pass filter 12 to provide a corresponding drive signal through phase compensator 24 and amplifier 13 to motor 14 by way of switch circuit 47 with the reuslt that the optical pickup head is shifted, for example, to follow the spiral configuration of the tracks on the record disc. In the access mode of the embodiment of the invention shown on FIG. 7, switch 22 is changed-over to the condition shown on the drawing so that each jump pulse from generator 20' is applied through switch 22 and amplifier 23 to coil 11 for causing the associated galvano mirror to make the laser beam spot jump across the record tracks. In response to the control pulse d from monostable multivibrator 46 triggered by the leading end of an output from OR circuit 32, and also in response to the jump direction command signal D, the movable contact of switch circuit 47 is changed-over to engage either fixed contact 47b or fixed contact 47c for the duration of the control pulse d. Thus, for example, when the jump pulse from generator 20' has an accelerating portion of positive polarity, as at c on FIG. 8C, the corresponding jump direction command signal D causes movable contact of switch circuit 47 to engage fixed contact 47c with the result that a drive signal of +5 V is applied to motor 14 for the duration of control pulse d. On the other hand, if the jump signal from generator 20' has an accelerating portion of negative polarity, as at c' on FIG. 8C, the corresponding jump direction command signal D causes movable contact of switch circuit 47 to engage fixed contact 47b with the result that a drive signal of −5 V is applied to motor 14 for the duration of the control pulse d. In either case, the drive signal applied to motor 14 in consequence of each jump pulse from generator 20' has a duration greater than the total duration of the accelerating and decelerating portions of the jump pulse. Thus, each jump pulse applied to coil 11 for angularly displacing the asociated galvano mirror and thereby causing the laser beam spot to jump across the record tracks is accompanied by radial movement of the pickup head, as a unit, by motor 14 for an extended period greater than the total duration of the jump pulse. By reason of the foregoing, high-speed jumping of the laser beam spot across the record tracks over an extended distance is possible with the embodiment of the invention shown on FIG. 7.

Figure 9:
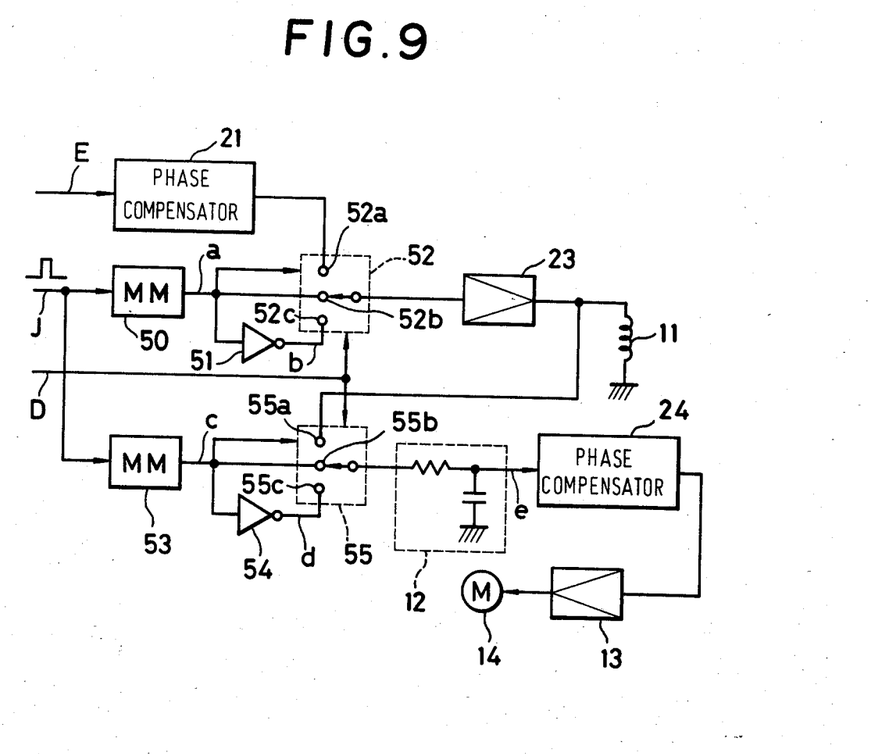

Referring now to FIG. 9 in which parts corresponding to those described above with reference to FIG. 3 are identified by the same reference numerals, it will be seen that, in still another embodiment of this invention, in the normal playback mode of the apparatus, the tracking error correction signal E supplied to a fixed contact 52a of a change-over switch circuit 52 is applied from the movable contact of the latter through amplifier 23 to the coil 11 associated with the tracking or galvano mirror for maintaining accurate scanning of a track on the record disc. Further, the tracking error correction signal E is applied to a fixed contact 55a of a change-over switch circuit 55 and, in the normal playback mode, the movable contact of switch circuit 55 engages fixed contact 55a for supplying the tracking error correction signal E to low pass filter 12 with the result that the motor 14 is driven in response to the DC component of the tracking servo signal.

Figure 10A:
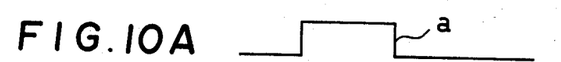
Figure 10B:
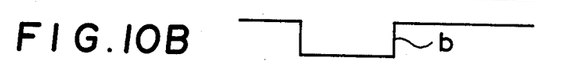

In the embodiment shown on FIG. 9, each jump signal applied to coil 11 in the access mode of the apparatus is constituted only by an accelerating portion, as at a or b on FIGS. 10A and 10B, respectively. In other words, contrary to the embodiments of this invention in FIGS. 3, 5 and 7, in the embodiment of FIG. 9, the jump pulse applied to coil 11 does not include a decelerating portion for slowing the movement of the laser beam spot across the tracks during the concluding portion of each jump, and the inherent damping action of the tracking servo mechanism is relied upon for stabilizing the same at the conclusion of each jump.

Figure 10C:
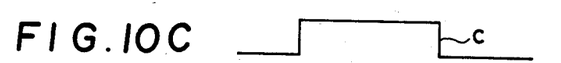
Figure 10D:
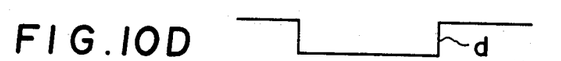

More particularly, in the access mode of the embodiment shown on FIG. 9, the system control unit (not shown) provides a jump command pulse J to trigger or enable a monostable multivibrator 50 which thereby produces a single pulse a (FIG. 10A) of positive polarity which is applied to a fixed contact 52b of switch circuit 52 and also as a control signal for the latter. The pulse a from monostable multivibrator 50 is also applied to an inverter 51 to provide a corresponding pulse b of negative polarity applied to a fixed contact 52c of switch circuit 52. In response to the pulse a from monostable multivibrator 50, switch circuit 52 is changed-over to engage its movable contact with either fixed contact 52b or fixed contact 52c in dependence on the level of the jump direction command signal D received from the system control unit and also applied as a control signal to switch circuit 52. Jump command signal J is further applied to a monostable multivibrator 53 to trigger or enable the latter for producing a drive pulse c (FIG. 10C) of positive polarity having a duration substantially greater than the duration of jump pulse a, and which is applied to a fixed contact 55b of switch circuit 55 and also applied to the latter as a control signal for switch circuit 55. The drive pulse c from monostable multivibrator 53 is also applied to an inverter 54 for obtaining a corresponding drive pulse d (FIG. 10D) of negative polarity which is applied to a fixed contact 55c of switch circuit 55. Finally, the jump direction command signal D is also applied to switch circuit 55 so that, in response to the drive pulse c, switch circuit 55 is changed-over to engage its movable contact with fixed contact 55b or 55c for applying either the drive pulse c (FIG. 10C) or the drive pulse d (FIG. 10D) to low pass filter 12 which, in turn, provides a corresponding drive signal e for motor 14.

It will be appreciated that, in the embodiment of FIG. 9, the drive signal applied to motor 14 for effecting radial movement of the optical pickup head in response to drive pulse c or drive pulse d has a duration substantially greater than the duration of the jump pulse a or b applied to coil 11 for causing the laser beam spot to jump by angular displacement of the tracking or galvano mirror. Thus, the width of the beam jump that is possible in the access mode of the apparatus is relatively increased.

In all of the above described embodiments of the invention, the coil 11 of the tracking servo mechanism has been referred to as controlling the angular deflection of the tracking or galvano mirror 5 on FIG. 1.

However, it will be apparent that the described embodiments of this invention may be similarly applied to optical reproducing apparatus of the type in which, for example, the objective lens 6 on FIG. 1 is movable both in the direction of its axis for focusing servo control and also in directions transverse to the tracks in response to the application of either the tracking error correction signal or jump pulses to a coil or coils corresponding to the coil 11 of the illustrated embodiments.

Although illustrative embodiments of the invention have been described in detail herein with reference to the accompanying drawings, it is to be understood that the invention is not limited to such precise embodiments and that other embodiments and modifications thereof will be apparent to a person skilled in the art without departing from the scope or spirit of the invention as defined in the appended claims.

I claim:

1. An optical reproducing apparatus for read-out of information recorded in substantially parallel tracks on a record medium; said apparatus comprising:

optical pickup means for reproducing said information including light source means emitting a beam of light and tracking servo means for controlling the point of the impingement of said beam of light on said record medium in a direction transverse to said track;

jump pulse generator means operative for supplying jump pulses to said tracking servo means by which said tracking servo means effects step-by-step movement of said light beam in said direction across said tracks, each of said jump pulses including at least an accelerating portion;

drive means operative for driving said optical pickup means in said direction transverse to said tracks;

control means for supplying jump drive signals to operate said drive means in synchronism with said jump pulses, with each of said jump drive signals having a duration greater than at least the duration of said accelerating portion of the jump pulse which is in synchronism therewith;

error correcting means for detecting deviation of said point of impingement of said beam of light from one of said tracks and producing a corresponding error correcting signal which, when supplied to said tracking servo means, removes said deviations;

first switch means for selectively supplying one of said jump pulses and said error correcting signal as an input to said tracking servo means;

said control means including low pass filter means receiving said error correcting signal for generating a standard drive signal in accordance with a low frequency component of said error correcting signal to operate said drive means; and second switch means for selectively providing said jump drive signals to said drive means for operating said drive means so long as said first switch means supplies said jump pulses from said jump pulse generating means as said input to said tracking servo means, and for providing said standard drive signal to said drive means for operating the same so long as said first switch means supplies said error correcting signal as said input to said tracking servo means;

said second switch means thereby having at least a first condition in which said standard drive signal from said low pass filter means is supplied through said second switch means to said drive means for operating the latter and a second condition in which said jump drive signals are supplied through said second switch means to said drive means.

2. An optical reproducing apparatus as in claim 1; wherein a source of a DC voltage is connected to said drive means as said jump drive signal in said second condition of said second switch means, and said control means includes pulse producing means for generating control pulses in response to said jump pulses with each of said control pulses having a duration greater than the duration of the respective jump pulse; and wherein each said control pulse is applied to said second switch means to change-over the latter from said first condition to said second condition for said duration of the control pulse.

3. An optical reproducing apparatus as in claim 2; wherein said second switch means has a third condition in which a second source of a DC voltage of opposite polarity to the first mentioned source is connected to said drive means for causing the latter to drive said optical pickup means transverse to said tracks in opposition to the first mentioned direction.

4. An optical reproducing apparatus as in claim 1; wherein said jump pulse generator means includes accelerating means for generating said accelerating portion of each jump pulse which is effective to accelerate step-by-step movement of said light beam when said accelerating portion is applied to said tracking servo means, decelerating means for generating a decelerating portion of each said jump pulse which follows the respective accelerating portion and which is effective to decelerate the step-by-step movement of said light beam when applied to said tracking servo means, and means for sequentially combining said accelerating and decelerating portion of said jump pulse for application to said tracking servo means.

5. An optical reproducing apparatus as in claim 1; wherein said control means includes a source of a plurality of predetermined DC voltages, pulse producing means for generating control pulses in synchronism with said jump pulses, each of said control pulses having a duration greater than the duration of the jump pulse in synchronism therewith, and said second switch means is operable by said control pulses to select one of said predetermined DC voltages as said jump drive signal for the duration of each said control pulse.

6. An optical reproducing apparatus as in claim 1; further comprising selectively operable means for inverting said jump pulses and said jump drive signals so as to effect said step-by-step movement of the light beam and said driving of the optical pickup means in a direction opposed to said direction transverse to said tracks.

7. An optical reproducing apparatus for read-out of information recorded in substantially parallel tracks on a record medium; said apparatus comprising:

optical pickup means for reproducing said information including light source means emitting a beam of light and tracking servo means for controlling the point of the impingement of said beam of light on said record medium in a direction transverse to said track;

jump pulse generator means operative for supplying jump pulses to said tracking servo means by which said tracking servo means effects step-by-step movement of said light beam in said direction across said tracks, each of said jump pulses including at least an accelerating portion;

drive means operative for driving said optical pickup means in said direction transverse to said tracks;

error correcting means for detecting deviation of said point of impingement of said beam of light from one of said tracks and producing a corresponding error correcting signal which, when supplied to said tracking servo means, removes said deviation;

first switch means for selectively supplying one of said jump pulses and said error correcting signal as an input to said tracking servo means;

control means including drive pulse generator means operated in synchronism with said jump pulse generator means for providing jump drive pulses of a duration greater than the duration of the respective jump pulses to operate said drive in synchronism with said jump pulses, low pass filter means having its output connected to said drive means, and said second switch means;

said first switch means having first and second conditions and said second switch means having at least first and second conditions, said error correcting signal being supplied through said first switch means to said tracking servo means and through said first and second switch means in series to said low pass filter means when said first and second switch means are in said first conditions thereof, and, in said second conditions of said first and second switch means, said jump pulses being applied through said first switch means to said tracking servo means and said jump drive pulses being applied through second switch means to said low pass filter means.

8. An optical reproducing apparatus as in claim 7; wherein said jump pulse generator means and said drive pulse generator means each include inverting means for providing inverted jump pulses and inverted jump drive pulses, respectively, and said first and second switch means have respective third conditions in which said inverted jump pulses are applied through said first switch means to said tracking servo means and said inverted jump drive pulses are applied through said second switch means to said low pass filter means for causing the drive means to drive said optical pickup means transverse to said tracks in opposition to the first mentioned direction.

9. An optical reproducing apparatus for read-out of information recorded in substantially parallel tracks on a record medium; said apparatus being selectively operable in one of a standard mode and an access mode and comprising:

optical pickup means for reproducing said information including light source means emitting a beam of light and tracking servo means operative for controlling the point of the impingement of said beam of light on said record medium in a direction transverse to said track;

jump pulse generator means operative during an access mode of said apparatus for supplying jump pulses to said tracking servo means by which said tracking servo means effects step-by-step movement of said light beam in said direction across said tracks, each of said jump pulses including at least an accelerating portion;

error correcting means for detecting deviation of said point of impingement of said beam of light from one of said tracks and producing a corresponding error correcting signal which, when supplied to said tracking servo means, removes said deviation;

switch means for selectively supplying, as an input for said tracking servo means, said jump pulses in said access mode and said error correcting signal in said standard mode:

drive means operative for driving said optical pickup means in said direction transverse to said tracks;

control means supplying a component of said error correcting signal to said drive means for operating the same; and a source of DC voltage supplying said DC voltage to said drive means for driving said optical pickup means in said direction during said access mode, said drive means moving said optical pickup means so that said tracking servo means accurately effects said step-by-step movement in said light beam in said direction.

* * * * *